Jan. 13, 1970   HANS-JÜRGEN C. H. DELFS   3,489,464
FLUIDIZING DISCHARGE APPARATUS FOR REMOVAL OF FLUIDIZED
MATERIAL FROM A CONVEYING SYSTEM
Filed April 13, 1967
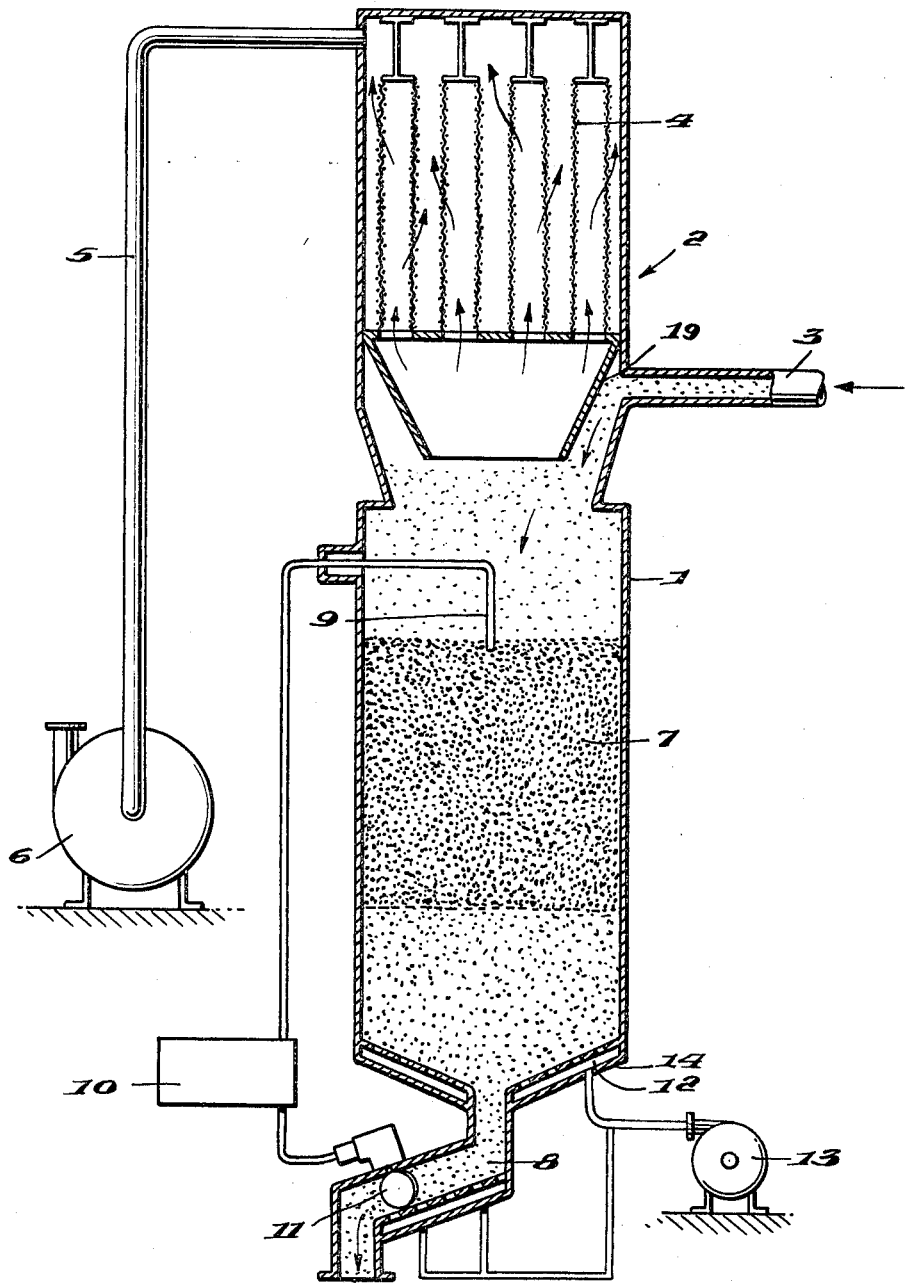
INVENTOR.
HANS-JURGEN CLAUS HEINRICH DELFS,
BY
ATTORNEYS United States Patent Office 3,489,464
Patented Jan. 13, 1970

3,489,464
FLUIDIZING DISCHARGE APPARATUS FOR REMOVAL OF FLUIDIZED MATERIAL FROM A CONVEYING SYSTEM
Hans-Jürgen Claus Heinrich Delfs, Hamburg-Sasel, Germany, assignor to Fuller Company, Catasauqua, Pa., a corporation of Delaware
Filed Apr. 13, 1967, Ser. No. 630,599
Claims priority, application Germany, Apr. 16, 1966,
P 39,217
Int. Cl. B65g 53/04, 53/40
U.S. Cl. 302—29         6 Claims

ABSTRACT OF THE DISCLOSURE

A fluidizing discharge apparatus on a vacuum conveying system having means for establishing a pressure seal of material between the conveying system and the material outlet of the discharge apparatus.

BACKGROUND OF THE INVENTION

For easy-pouring bulk pulverulent material which is conveyed pneumatically in a vacuum conveying system, it is known in the prior art to construct a discharge apparatus for removing material from the conveying system wherein a column of material in the discharge apparatus is used as a sealing means between the negative pressure in the conveying system and the atmospheric pressure at the material discharge outlet of the apparatus.

Such an apparatus has proved practical for the removal of readily flowable materials, such as grain. However, for fluidizable materials such as flour, raw cement, etc., which do not flow readily by gravity but tend to bridge over the discharge outlet, this type of discharge apparatus has not been found to be satisfactory.

For such fluidizable materials, it is required that some means be provided in the vicinity of the discharge outlet to fluidize the material in order to prevent the abovementioned bridging effect. One means of accomplishing this is by introducing a pressurized gas into the material to effect the necessary fluidization.

It can be appreciated that this fluidizing gas must be prevented from discharging into the vacuum conveying system and interrupting the negative pressure of the conveying system.

This has been accomplished previously by the use of various means, such as a discharge chamber containing multi-cells wherein the individual cells may be completely isolated from the conveying system; a pendulm flap valve which is arranged to close the conveying system due to the effect of the back pressure in the discharge apparatus; and a discharge receptacle which is alternately filled and emptied while the conveying system is started and stopped, respectively. Such units display the disadvantage of rapid wear and/or the necessity of intermittent operation.

SUMMARY OF THE INVENTION

This invention relates to a fluidizing discharge apparatus which removes fluidized material from a vacuum conveying system and comprises a single receptacle. A gas and material inlet is located in the upper portion of the receptacle for receiving material from the vacuum conveying system. Also arranged in the upper portion of the receptacle is a gas outlet situated for discharging the conveying gas from the receptacle. The lower portion of the receptacle carries a material outlet and a means for supplying fluidized gas to the material located in the lower portion of the receptacle. Still further, this discharge apparatus is provided with a means for maintaining a pressure seal of material within the receptacle between the gas and material inlet and the material outlet.

Previously, such an apparatus, which utilized a column of material as a sealing means, was considered to be impractical for use in conjunction with fluidizing units; however, contrary to this belief, it was surprising to find in practical experiments that a material column could be fluidized in its lower region sufficiently to facilitate the discharge of material while, at the same time, the upper column of material could be maintained in a dense state sufficient to provide a pressure seal of material.

It is readily apparent that this invention overcomes the aforementioned disadvantages of the prior art by utilizing a simplified technique.

BRIEF DESCRIPTION OF THE DRAWING

The figure is a schematic sectional view of the invention.

DESCRIPTION OF THE PREFERRED EMBODIMENT

The fluidizing discharge apparatus comprises an upright receptacle 1 having a bottom wall 14 sloping downwardly toward a material outlet 8. The receptacle 1 has situated in its upper end a gas and material separator, generally indicated by 2, into which opens a pneumatic conveying line 3 for fluidizable material. The gas and material separator 2 may be a cyclone separator. The conveyor gas is freed from entrained particles in pluralities of filters 4 and is suctioned off by the blower 6 via line 5. Negative pressure in relation to atmospheric pressure prevails in the gas and material separator 2, and hence also in receptacle 1.

The gas and material separator 2 carries a downwardly extending wall 19 which is positioned opposite the conveying line 3 for deflecting the incoming gas and material toward the bottom of the receptacle 1.

In the receptacle 1 there is contained a material column 7 which discharges through the material outlet 8 and is maintained at a constant level by an appropriate level sensing system. The level sensing system consists of a material level sensing device including a pressure member 9, such as a bubble tube, and a control mechanism 10 communicating with the pressure member 9. Further, a metering valve 11, located in the material outlet 8, is operatively connected to the material level sensing device and is responsive thereto.

The bottom of the receptacle is provided with air activated fluidizing units 12 which are fed by the blower 13. The material is thus fluidized in the lower portion of the material column to facilitate its discharge through the outlet 8.

In the desired state of operation, only the material in the bottom of the material column 7 is aerated; thus, the fluidizing gas actually does not pass through the entire material column 7. In other words, the quantity of fluidizing gas and entering the gas material separator is so small that it does not endanger the negative pressure in the conveying line 3. The material column 7 must be maintained at a predetermined minimum level sufficient to provide a dense region of material above the fluidizing material in the lower portion of the column. This dense region of material acts as a pressure seal of material between the negative pressure, prevailing in the gas and material separator 2, and the atmospheric pressure present at the material outlet 8.

To insure the required minimum level of material, the level sensing member 9 is positioned at a predetermined location. As the level of material in the column 7 varies from its predetermined level, the level sensing member 9 transmits a signal to the control mechanism 10 which, in turn, regulates the metering valve 11 to discharge more or less material through the outlet 8 in order to maintain the column at its predetermined level.

Various changes may be made in the details of the invention as described without sacrificing the advantages thereof or departing from the scope of the appended claims.

I claim:

1. A fluidizing discharge apparatus for removal of fluidized material from a vacuum conveying system comprising a single receptacle; a gas and material inlet in the upper portion of the receptacle for receiving material from the vacuum conveying system; a gas outlet in the upper portion of the receptacle for discharging the conveying gas from the receptacle; a material outlet in the lower portion of the receptacle; fluidizing means disposed between the gas and material inlet and the material outlet for supplying a fluidizing gas to the lower portion of the receptacle to fluidize only the lower portion of a material column in the receptacle; and means for maintaining a minimum level of material in the receptacle to provide a dense material zone in the upper portion of the material column to act as a pressure seal of material within the receptacle between the gas and material inlet and the fluidized lower portion of the material column.

2. The discharging apparatus of claim 1 including a gas and material separator disposed between the gas and material inlet and the gas outlet.

3. The discharge apparatus of claim 2 wherein said gas and material separator comprises a separator having a means to deflect the material entering the receptacle towards the lower portion thereof and a filtering media for separating gas from material.

4. The discharge apparatus of claim 1 wherein said means for maintaining the pressure seal of material comprises a material level sensing device and a material discharge metering valve positioned within the material discharge outlet, said valve being operatively connected and responsive to said level sensing device.

5. The method of discharging material from a vacuum conveying system comprising forming a column of material within a receptacle between the vacuum conveying system and an outlet of said receptacle; maintaining the material at a predetermined level within the receptacle; subjecting the lower portion of the column to fluidization while maintaining the upper portion of the column in a substantially dense state sufficient to form a pressure seal of material between the conveying system and the material outlet of the receptacle.

6. A fluidizing discharge apparatus for removal of fluidized material from a vacuum conveying system comprising a single receptacle; a gas and material inlet in the upper portion of the receptacle for receiving material from the vacuum conveying system; a gas outlet in the upper portion of the receptacle for discharging the conveying gas from the receptacle; a gas and material separator disposed between the gas and material inlet and the gas outlet, said gas and material separator comprising a separator having a means to deflect a material entering the receptacle downwardly into the receptacle and a filtering media for separating gas from material; a material outlet in the lower portion of the receptacle; fluidizing means disposed between the gas and material inlet and the material outlet for supplying a fluidizing gas to the lower portion of the receptacle to fluidize only the lower portion of a material column in the receptacle; and means for maintaining a minimum level of material in the receptacle to provide a dense material zone in the upper portion of the material column to act as a pressure seal of material within the receptacle between the gas and material inlet and the fluidized lower portion of the material column comprising a material level sensing device and a material discharge metering valve positioned within the material outlet, said valve operatively connected and responsive to said level sensing device.

References Cited

UNITED STATES PATENTS

| 2,252,581 | 8/1941 | Saint-Jacques | 302—59 |
| 2,919,159 | 12/1959 | Lacroix | 302—53 |
| 2,946,626 | 7/1960 | Atkinson et al. | 302—59 X |
| 3,069,205 | 12/1962 | McIver et al. | 302—17 |
| 3,208,799 | 9/1965 | Rivers | 302—17 |

FOREIGN PATENTS

| 1,178,363 | 9/1964 | Germany. |
| 1,178,364 | 9/1964 | Germany. |
| 376,430 | 5/1964 | Switzerland. |

ANDRES H. NIELSEN, Primary Examiner

U.S. Cl. X.R.

302—42, 59